United States Patent
Wallace et al.

(10) Patent No.: US 12,352,572 B2
(45) Date of Patent: Jul. 8, 2025

(54) SURVEYING SYSTEM FOR SURVEYING IN HARSH ENVIRONMENTS

(71) Applicant: ROVCO Limited, Bristol (GB)

(72) Inventors: Iain Wallace, Bristol (GB); Lyndon Hill, Bristol (GB); Pep Lluis Negre Carrasco, Bristol (GB); Nicholas Read, Bristol (GB)

(73) Assignee: ROVCO Limited, Bristol (GB)

( * ) Notice: Subject to any disclaimer, the term of this patent is extended or adjusted under 35 U.S.C. 154(b) by 779 days.

(21) Appl. No.: 17/593,555

(22) PCT Filed: Mar. 10, 2020

(86) PCT No.: PCT/EP2020/056318
§ 371 (c)(1),
(2) Date: Sep. 20, 2021

(87) PCT Pub. No.: WO2020/187642
PCT Pub. Date: Sep. 24, 2020

(65) Prior Publication Data
US 2022/0178690 A1    Jun. 9, 2022

(30) Foreign Application Priority Data
Mar. 21, 2019 (EP) .................................... 19164343

(51) Int. Cl.
*G01C 15/00* (2006.01)
*G05D 1/00* (2006.01)
*G06T 17/00* (2006.01)

(52) U.S. Cl.
CPC ........... *G01C 15/00* (2013.01); *G05D 1/0016* (2013.01); *G06T 17/00* (2013.01)

(58) Field of Classification Search
CPC .... G01C 15/00; G01C 21/005; G05D 1/0016; G06T 17/00
See application file for complete search history.

(56) References Cited

U.S. PATENT DOCUMENTS

| | | | |
|---|---|---|---|
| 10,699,108 B1* | 6/2020 | Hansen | G06V 40/103 |
| 2006/0062490 A1* | 3/2006 | Ha | H04N 13/139 |
| | | | 348/E13.068 |

(Continued)

FOREIGN PATENT DOCUMENTS

| WO | WO 2014/060562 | 4/2014 |
|---|---|---|
| WO | WO 2019/014245 | 1/2019 |

OTHER PUBLICATIONS

International Search Report issued Jun. 2, 2020 in PCT/EP2020/056318.

(Continued)

*Primary Examiner* — Xuemei G Chen
(74) *Attorney, Agent, or Firm* — Potomac Law Group, PLLC; John (Jack) Penny

(57) ABSTRACT

A system which includes a mobile device and a server. The mobile device captures images of the survey site. A pose sensor detects the pose of the mobile device. The captured images are transferred to a data processor running a 3D reconstruction algorithm. The 3D reconstruction algorithm generates 3D survey data based on the images which is used to develop a local 3D model. The data processor also uses the images to create processed data. A transceiver transmits the processed data and/or pose data to the server. The server receives the 3D survey data and develops a server site 3D model.

18 Claims, 8 Drawing Sheets

(56) References Cited

U.S. PATENT DOCUMENTS

| | | | |
|---|---|---|---|
| 2010/0306335 A1* | 12/2010 | Rios | H04W 8/005 |
| | | | 709/211 |
| 2012/0099399 A1 | 4/2012 | Lichter et al. | |
| 2012/0194516 A1* | 8/2012 | Newcombe | G06T 17/00 |
| | | | 345/420 |
| 2016/0063768 A1 | 3/2016 | Parente Da Silva | |
| 2016/0259050 A1 | 9/2016 | Proctor et al. | |
| 2017/0178392 A1* | 6/2017 | Zuccarino | G06T 15/205 |
| 2017/0251143 A1* | 8/2017 | Peruch | H04N 13/257 |
| 2018/0059247 A1 | 3/2018 | Isaksson et al. | |
| 2018/0130255 A1* | 5/2018 | Hazeghi | H04N 23/12 |
| 2018/0192035 A1* | 7/2018 | Dabeer | G06T 5/50 |
| 2018/0249343 A1* | 8/2018 | Priest | H04W 16/18 |
| 2018/0253593 A1* | 9/2018 | Hu | G06V 40/165 |
| 2018/0357907 A1* | 12/2018 | Reiley | G08G 1/005 |
| 2019/0014345 A1 | 1/2019 | Gelman et al. | |
| 2019/0051054 A1* | 2/2019 | Jovanovic | G06F 3/04815 |
| 2019/0385360 A1* | 12/2019 | Yang | G01C 21/3837 |
| 2020/0043189 A1* | 2/2020 | Bao | G06T 7/75 |
| 2020/0074747 A1* | 3/2020 | Deng | G06T 3/14 |
| 2020/0134847 A1* | 4/2020 | Gros | G06T 7/73 |

OTHER PUBLICATIONS

Written Opinion issued Jun. 2, 2020 in PCT/EP2020/056318.
European Examination Report for European Application No. 20 707 693.6 dated Nov. 13, 2023.
Examination Report issued Jan. 15, 2020 in GB Application No. GB1903882.7.
Extended European Search Reported issued Sep. 25, 2019 in EP Application No. 19164343.6.
Search and Examination Report issued Sep. 24, 2019 in GB Application No. GB1903882.7.

* cited by examiner

SURVEYING SYSTEM FOR SURVEYING IN HARSH ENVIRONMENTS

This application claims benefit under 35 U.S.C. § 365 to PCT/EP2020/056318 filed on Mar. 10, 2020, and under 35 U.S.C. § 119 to EP 19164343.6 filed on Mar. 21, 2019, the disclosures of which are all herein incorporated by reference in their entirety.

BACKGROUND

When surveying a subsea site, asset, environment, or any other harsh environment facility it is typical to use a mobile survey device such as a robot or remotely operated vehicle. For brevity, such facilities will be referred to as a survey site and such survey devices will be referred to as a mobile device.

A mobile device can include one or more cameras to image the survey site. Survey experts or the site owner can oversee the survey. Given that survey sites are located in harsh environments with limited communication channels, it can be challenging to enable experts to access the survey data and potentially control the survey in real-time without requiring the experts to potentially place themselves in danger by being physically present at the survey site. It would be preferable for the experts to be located at a remote, safe site. Thus, survey options are:
- to store survey data on a memory in the mobile device and transfer it to the safe location for offline analysis;
- for low resolution/quality data to be transmitted over a data link incrementally thus limiting the usefulness of the survey;
- for the experts to go to the potentially hazardous survey site to view the survey data live.

SUMMARY

The present inventors have devised a new mobile device, system and method which can enable survey experts to obtain real-time access to high resolution/quality survey data over low or unreliable bandwidth data links and/or enable survey experts to manage the survey in real-time while at the safe site.

By way of a non-limiting overview, embodiments of the invention relate to a system which includes a mobile device and a server. In at least some embodiments, the mobile device captures images of the survey site and includes a pose sensor or module for detecting the pose of the mobile device. The captured images are transferred to a data processor running a 3D reconstruction algorithm. The 3D reconstruction algorithm generates 3D survey data based on the images which is used to develop a local 3D model. The data processor processes the high resolution images to produce processed data, which is smaller in size in comparison to the size of raw images. The processed data, which can comprise 3D survey data, is transferred to a transceiver to transmit the processed data and/or pose data to a remote server. The remote server receives the processed data and develops a server site 3D model. Thus, the system can transmit locally processed survey data across low bandwidth data links to enable:
- efficient use of the data link;
- faster processing of the survey data to extract useful models;
- co-operative processing of different aspects of the data by different computers;
- live evaluation of the survey data by experts situated at a remote location;
- reduced energy requirements for the survey device as computing burden can be offloaded.

In accordance with a first aspect of at least one embodiment of the invention, there is provided a surveying system. The surveying system can be arranged or suitable for surveying in harsh environments such as subsea. The surveying system comprises:
- a mobile device comprising:
  - a casing defining a sealed enclosure; and
  - an imaging device;
- a first data processor;
- a first computer memory;
- a pose sensor arranged to determine pose data representing a pose of the imaging device;
- a first data transceiver;
- wherein the first data processor is arranged to:
  - receive images from the imaging device and execute a first 3D reconstruction algorithm to generate 3D survey data from the received images and develop a local 3D model on the computer memory;
  - process the received images to form processed data; and
  - cause the first data transceiver to transmit the processed data and/or the pose data for receipt by a remote server.

Thus, a surveying system according to the first aspect runs a 3D reconstruction algorithm to build a local 3D model based on the received high resolution images. The data processor processes the high resolution images to form processed data. The processed data can comprise 3D survey data such as a 3D model component (e.g. a point cloud), reduced resolution images, or an identification of a key frame based on images captured by the imaging device. The imaging device can comprise one or more cameras, sonar equipment, or laser scanning equipment, or a combination of such equipment. Since the 3D reconstruction algorithm processes images captured locally by the imaging device, the images can be high resolution. The resulting processed data is relatively small in data-size in comparison to the images used to produce it. The flow of new images from the imaging device allows the 3D reconstruction algorithm to be updating and developing the local 3D model incrementally. Pose data can represent the imaging device and/or mobile device, as for example the imaging device can have a known spatial/positional relationship with respect to the mobile device. The transceiver can incrementally transmit the processed data and/or the pose data to the remote server. The remote server can for example be at a safe site, where survey experts are monitoring the survey, or on a boat operating the mobile device (e.g. a remote vehicle (ROV)), or as part of a cloud computing system. The remote server has knowledge of the 3D reconstruction algorithm used to generate the 3D survey data. Embodiments of the invention can therefore exploit the fact that it is known exactly how the data is generated and processed at both ends of the system. Knowing the survey parameters and algorithms used to generate the 3D survey data, the remote server can use the received 3D survey data to develop a server site 3D model. Likewise, the pose data can be used to indicate the pose of the mobile device relative to the server site 3D model, to enable survey experts to visualize the location and orientation of the mobile device relative to the survey site as the model of the survey site is developed.

The mobile device can comprise the first data processor and/or the first computer memory and/or the pose sensor and/or the first data transceiver, with some or all of the components being housed within the casing. Thus, the acquiring, local processing and communications components of the surveying system can be located the mobile device.

Alternatively, the surveying system of at least one embodiment can further comprise a vessel such as a ship or oil rig, wherein the first data processor comprises:
- a mobile device data processor located on the mobile device; and
- a vessel data processor located on the vessel, the mobile device data processor being communicatively coupled to the vessel data processor by a vessel data link,
- wherein the mobile device comprises the imaging device and the mobile device data processor is configured to transmit the images captured by the imaging device to the vessel data processor,
- wherein the vessel comprises the first computer memory and the first data transceiver and the vessel data processor is arranged to:
- receive the images from the imaging device and execute a first 3D reconstruction algorithm to generate 3D survey data from the received images and develop a local 3D model on the computer memory;
- process the received images to form processed data; and
- cause the first data transceiver to transmit the processed data and/or the pose data for receipt by the remote server.

In some embodiments the pose sensor can be implemented on one or both of the mobile device and the vessel. Moreover, the mobile device can pre-process the images before sending them to the vessel; for example, the mobile device data processor can be arranged to:
- receive the images from the imaging device and execute the first 3D reconstruction algorithm to generate 3D survey data from the received images and develop the local 3D model on mobile device computer memory; and/or
- process the received images to form pre-processed data; and
- transmit the pre-processed data and/or the pose data for receipt by the vessel data processor.

The mobile device can be communicating with a first remote server (for example on a vessel such as a boat) which can in turn be communicating with a second remote server at a safe site. The first remote server can be located geographically closer to the mobile device (and thus the hazardous environment, for example, on a boat if the mobile device was a subsea device) than the second remote server at the safe site such that the mobile device has a feedback link to more computer power. This first remote server in turn receives feedback from the second remote server at a safe location, in a chain, thus the mobile device has access to the cloud edge. The communication link between the mobile device and the first remote server can be a medium bandwidth link (e.g. 512 kbps-20 Mbps, although it is understood that this is a relative technological term, and likely to change over time as technology changes), and the communication link between the first remote server and the second remote server can be a low bandwidth link (e.g. less than 512 kbps, although it is understood that this is a relative technological term, and likely to change over time as technology changes). Low bandwidth can be defined for example as 2.5% of the bandwidth of medium bandwidth, 5% of the bandwidth of medium bandwidth; 10% of the bandwidth of medium bandwidth, or 50% of the bandwidth of medium bandwidth. Medium bandwidth can be defined for example as 2.5% of the bandwidth of high bandwidth 5% of the bandwidth of high bandwidth 10% of the bandwidth of high bandwidth or 50% of the bandwidth of high bandwidth. There can also be multiple remote servers communicatively connected to the first remote server. Alternatively, the communication link between the mobile device and the first remote server can be a low bandwidth link. The communication link between the first remote server and the second remote server can be a medium bandwidth link. This gives rise to at least the same advantages as a mobile device with a single remote server.

By locating a potentially unlimited number of experts at a safe location, the survey can be overseen and controlled more easily. Additional expertise may be called on using conventional communications for live feedback; furthermore, as there do not have to be more people on a boat or in a hazardous location where safety considerations increase the cost, the survey may be carried out more cheaply.

The pose sensor can comprise a Simultaneous Localisation and Mapping (SLAM) algorithm. The pose is the combination of position and orientation of the mobile device in the environment. The SLAM algorithm can use the images to generate the pose data. Alternatively or in combination, the pose sensor can comprise one or more other sensors such as a gyroscope or accelerometer to aid in the generation of pose data. Advantageously, the pose data transmitted by the first data transceiver is relatively small in size in comparison to the images used to produce it. If the mobile device moves, only the pose data can be transmitted and updated, this allows the survey experts (or users) to be able to view an up-to-date and consistent 3D survey data and server site 3D model. Thus, the pose data can represent a most recently determined pose for the mobile device or imaging device.

The processed data can comprise the 3D survey data.

The 3D survey data can comprise a local 3D model component generated by the first 3D reconstruction algorithm. The local 3D model can comprise one or more local 3D model components. Thus, the local 3D model can be transmitted incrementally as it is updated by the 3D reconstruction algorithm. Thus, the survey site can process the local 3D model directly to verify and develop the survey site 3D model and incrementally visualise the survey site 3D model. This allows the survey expert to be able to view an up-to-date and consistent 3D survey data and server site 3D model. The local 3D model can comprise coordinates for 3D points (e.g. a point cloud) which are relevant to the objectives of the survey.

The processed data can comprise a key frame and the first data processor can be configured to identify whether a received image is a key frame and, if so, can command the first data transceiver to transmit the key frame for receipt by the remote server. Key frames can be defined by the degree of difference between two unique views of an object. The first 3D reconstruction algorithm or other process can be arranged to compare a received image with a preceding image (or an earlier image) to determine the degree of difference. The received image can contain an object from a different view point with respect to the preceding image due to movement of the object and/or the mobile device. Once a difference threshold has been exceeded the received image is marked as a key frame. Advantageously, key frame identification allows for efficient use of the data link between the mobile device and the remote server for the remote server to develop the server site 3D model. The processed data can further comprise key frames (i.e. images) from a single view to be transmitted with 3D survey data (e.g. a sparse, scaled point cloud) to the remote server. As each image is received, the remote server can perform structure from motion incrementally or on all images. By this technique, a 3D model can be generated, which can be scaled by the point cloud.

Using key video frames transmitted from the mobile device or vessel, it is possible to perform advanced image enhancement algorithms at the remote server to determine parameters for improving the image or video quality; the low bandwidth parameters can then be fed back to the first data processor which can then perform live rendering of enhanced images or video and thus can improve the visualisation for an operator of the mobile device, potentially making the survey faster. Using the same key frames, object detection, such as by machine learning, can be performed and object label co-ordinates sent back to the operator of the mobile device or kept at the remote server for the survey expert, to generate augmented reality views. Thus the mobile device operator does not need to be an expert in the object or site being surveyed in order to know how to use the mobile device to inspect it. The (2D) key frame images from a single view can be transmitted with a sparse, scaled point cloud to the remote server. The remote server can perform a 3D reconstruction algorithm (e.g. 'structure from motion') incrementally or on all images, as each image is received. By this technique a 3D model may be generated, scaled by the point cloud. Alternatively, the mobile device can be autonomous, in this case the results of the enhancement algorithms can still improve the accuracy and speed of the survey. Key frames can be generated by the first 3D reconstruction algorithm, and the 3D survey data can comprise a key frame.

The processed data can comprise processed images based on the received images. Thus, the first data processor can be configured to process received images to generate processed images, wherein processing the received images comprises reducing the spatial, temporal or colour resolution of the received image. For example, the images can be down-sampled to half size, key frames can be selected or colour reduced from three channels to a single colour channel. Alternatively, received images can be transmitted directly or with reduced spatial, temporal or colour resolution. Received images can be 2D images.

The processed data can be processed at the safe location and some data fed back to the survey location where it can be used to improve the processing of the data and/or the quality of the survey.

The first data processor can be arranged to run a model refinement algorithm to develop the local 3D model in response to receipt of refined 3D survey data from the remote server via the first data transceiver. Advantageously, co-operative processing by the mobile device, and/or vessel, and the remote server allows for different aspects of the data to be computed. Thus, corrections or additions can be incorporated into the local 3D model.

The mobile device can comprise a remotely operable or autonomous mobile platform such as an underwater remotely operable vehicle (ROV), an autonomous underwater vehicle (AUV), an unmanned air vehicle (UAV), an unmanned ground vehicle (UGV), an unmanned underwater vehicle (UUV), or an autonomous surface vehicle (ASV).

In one example, the mobile device can comprise a subsea remotely operable or autonomous vehicle including a propulsion system, a steering system and a command controller arranged to control the propulsion system and the steering system in accordance with command signals provided from a control station which is remote with respect to the vehicle, or the first data processor.

The mobile device can further comprise steering and propulsion modules communicatively coupled to the first data processor, the first data processor being configured to run a navigation algorithm for controlling steering and propulsion of the mobile device. Thus, the navigation algorithm can control where the mobile device moves in the survey environment. Advantageously, the mobile device can be controlled to compensate for mobile device drift and also make navigational choices enabling the most efficient or quickest route to develop the most suitable model for a particular survey, trading off detail and speed.

The navigation algorithm can be configured to control steering and propulsion of the mobile device in accordance with control commands received from the remote server via the first data transceiver. Advantageously, the remote server can notify the navigation algorithm to amend the navigation if corrections or further investigation are required. The survey expert could also notify the navigation algorithm to amend navigation if they desired. Thus, the navigation algorithm can make a choice to amend navigation. Alternatively, control commands received from the remote server can override the navigation algorithm.

The development of the local 3D model in response to receipt of refined 3D survey data can further comprise completing missing loop closures. Loop closing is the act of correctly asserting that a vehicle has returned to a previously visited location.

The first data transceiver can further send back confirmations to the remote server to inform it if the information the mobile device received aided development of the local 3D model. Advantageously, the remote server can amend the refined 3D survey data based on the mobile device.

The first data processor can be arranged to process the 3D survey data using cryptographic keys prior to transmission. Advantageously, this encodes the 3D survey data making the data more secure/confidential.

The casing can be a pressure vessel configured to withstand pressure differentials between its exterior and interior or filled with a pressure compensating gas or fluid; enabling the camera module to be continuously used in harsh underwater environments, such as in at least two metres of water, or at least five metres of water, or in at least 10 metres of water, and in some cases at least twenty metres of water. In other embodiments the casing can be configured to enable the camera module to be continuously used in other harsh environments such as in a vacuum.

The first data transceiver can comprise a wireless base station, a wired data link, or any other type of transceiver known in the art. Alternatively, the first data transceiver can comprise a separate transmitter and receiver. The first data transceiver can be full duplex or half duplex.

If the first data transceiver is wireless it can comprise one or more antennas capable of operating at similar or different frequencies.

The surveying system can further comprise a server, the server comprising:
 a second data processor;
 a second computer memory including a repository detailing the first 3D reconstruction algorithm utilised by the mobile device;
 a second data transceiver;
 wherein the second data processor is arranged to:
 receive the processed data and/or pose data from the second data transceiver; and
 run a second 3D reconstruction algorithm to develop a server site 3D model on the second computer memory using the processed data and/or pose data.

The server can be remote from the mobile device and can be remote from the vessel. The vessel data link can be wireless or wired. The server can be greater than 50 meters from the mobile device and/or the vessel. Alternatively, the server can be greater than 100 meters from the mobile device and/or the vessel. Alternatively, the server can be greater than 500 meters from the mobile device and/or the vessel. Alternatively, the server can be greater than 1000 meters from the mobile device and/or the vessel. Alternatively, the server can be greater than 5 kilometres from the mobile device and/or the vessel. Alternatively, the server can be greater than 50 kilometres from the mobile device and/or the vessel.

Thus, a surveying system can build the same model at the server and see where the mobile device is relative to the modelled server site. The server has knowledge of the first 3D reconstruction algorithm used to generate the local 3D model. The mobile device can capture video in high spatial, temporal or colour resolution but often needs to downsample and compress data for transmission. The algorithms used at the mobile device can take advantage of the full resolution while the server can perform more intensive computations but using different resolutions and possibly lower quality images.

The second data processor can have greater data processing capability than the first data processor, or at least in embodiments having a mobile device data processor and a vessel data processor, the mobile device data processor. Thus, the second data processor can be physically larger than the first data processor and unconstrained by the casing of the mobile device. Advantageously, the second data processing can perform more computationally complex algorithms and visualisations, the results of which can be transmitted to the first data processor. Thus, efficient use of the different data processors can be achieved with cooperative processing. The vessel data processor can have greater data processing capability than the mobile data processor.

The second data processor can be arranged or configured to receive a request to access the server site 3D model, processed data, and/or pose data via the second data transceiver from a client server and the second data processor can also receive a desired data format via the second data transceiver from a client server. The second data processor can process the request and translate the server site 3D model, processed data, and/or pose data, into the desired data format to generate inspection data. The inspection data can be transmitted back to the client server via the second data transceiver.

The second data processor can convert the received data and data it has processed into formats suitable for those observing the survey remotely. The end users can also connect to the server via network lines and request a copy of the data to inspect in a supported data format, upon receipt of the request the server can also perform conversion from one data format to another format as requested by the client on the network link.

The first and second 3D reconstruction algorithms can comprise a structure from motion algorithm. In the case where processed data comprises key frames, the first and/or second 3D reconstruction algorithms can be performed incrementally or on all key frames, as each key frame is received. By this technique of incremental updates, a server site 3D model can be generated and can be scaled by the 3D survey data, e.g. a point cloud.

The processed data can comprise the 3D survey data and the second data processor can be configured to run a refinement algorithm to refine the 3D survey data to produce refined 3D survey data. The second data processor can also be configured to command the second data transceiver to transmit the refined 3D survey data to the mobile device. Advantageously, the refined 3D survey data can produce improved visualisations and verifies the accuracy of the local 3D model. Thus, any inaccuracies or areas of low resolution in the local 3D model can be developed.

The refinement algorithm can be configured to identify errors and correct the positions of features within the server site 3D model. The features within the server site model can be: points on a point cloud; vertices, edges, and/or faces of a mesh model; or any other features of a model. Thus, improved model accuracy can be achieved. Corrections of positions of the features can for example be used to complete loop closures. The refinement algorithm can also determine if the selection of key frames sent from the mobile device could be improved. The remote server can transmit a new key frame selection scheme via the second data transceiver based upon the results of the refinement algorithm.

The refinement algorithm can be configured to develop the server site 3D model to include additional features and cause the second data transceiver to transmit the additional features to the first data transceiver. Refined 3D survey data can comprise the additional features. Additional features can be points on a point cloud, if the server site 3D model is a point cloud model. Alternatively, the features can be vertices, edges, or faces of a mesh, if the server site 3D model is a mesh model, or any other features of a model. Additional features can also be object labels from an object detection algorithm. Advantageously, the refined 3D survey data can be transmitted to the first data processor and the first data processor can process the refined 3D survey data to update its local 3D model without the need to compute the additional features, thereby increasing the processing speed at the mobile device and the speed of survey completion. Advantageously, by only transmitting the additional features or the updated location of existing features, and not the whole model, efficient use of the data link can be achieved. The first data processor can process the refined 3D survey data to identify errors and correct the positions of features within the local 3D model.

The second data processor can be configured to run a path override algorithm to generate override control commands and cause the second data transceiver to transmit the override control commands to the first data transceiver. Thus, if the second data processor or a survey expert (or user) determines that there is a section of the survey which is insufficient, then the mobile device can perform corrective operations. Thus, increasing the accuracy of the survey. Alternatively, a second navigation algorithm (which can be on the second data processor or another data processor) can generate the override control commands based on the results of the refinement algorithm.

The second data transceiver can comprise a wireless base station, a wired data link, or any other type of transceiver known in the art. Alternatively, the second data transceiver can comprise a separate transmitter and receiver. The second data transceiver can be full duplex or half duplex. If the second data transceiver is wireless it can comprise one or more antennas capable of operating at similar or different frequencies.

The system can also comprise a 3D occupancy grid allowing the remote server to access the extent of the surveyed data without downloading all of it. Advantageously, the 3D occupancy grid may be used during transmissions as it can have a compact representation. Thus, the 3D occupancy grid can direct the mobile device to survey new areas where important new detail is anticipated. Moreover, efficient use of the data link between the mobile device and/or vessel and the remote server can be achieved.

The system can store high resolution versions of the images on the first computer memory for further processing offline while transmitting lower resolution versions of the images to the remote server. The transmitted images may have a lower spatial, temporal or colour resolution; for example, the images may be downsampled to half size, key frames could be selected or colour reduced from three channels to a single colour channel.

Aspects of at least one embodiment of the invention can be applied to communications between autonomous survey vehicles when working together to co-operatively survey a hazardous location. Thus, the system can comprise a plurality of mobile devices according to the first aspect each incrementally sending processed data to the server and/or each (some or all) of the plurality of mobile devices. The server can be a remote server or located on the vessel as the vessel data processor. The plurality of mobile devices can alternatively send model parameters etc. to enable the plurality of mobile devices to co-operatively survey the site. The plurality of mobile devices can run identical or different 3D reconstruction algorithms. The server can receive processed data from all mobile devices to develop the server site 3D model and visualisations. The server can also transmit updates generated by algorithms on the server.

In accordance with a second aspect of at least one embodiment of the invention, there is provided a method of surveying in harsh environments, the method comprising:
  receiving images from an imaging device;
  determining pose data representing a pose of the imaging device;
  processing the received images to generate
a local 3D model and processed data;
  transmitting from a transceiver the processed data and/or the pose data for receipt by a remote server and optionally further comprising:
  at a server remote from the imaging device:
  receiving the processed data and/or pose data transmitted from the transceiver;
  processing the processed data and/or pose data to develop a server site 3D model.

The method can further comprise, at the server, running a refinement algorithm to refine the 3D survey data to produce refined 3D survey data and transmitting the refined 3D survey data to the transceiver.

The method can further comprise, receiving the refined 3D survey data from the transceiver and processing the refined 3D survey data to identify errors and correct the positions of features within the local 3D model.

Optional features of the first aspect can be applied to the second aspect in an analogous manner.

DETAILED DESCRIPTION

Figure 1:
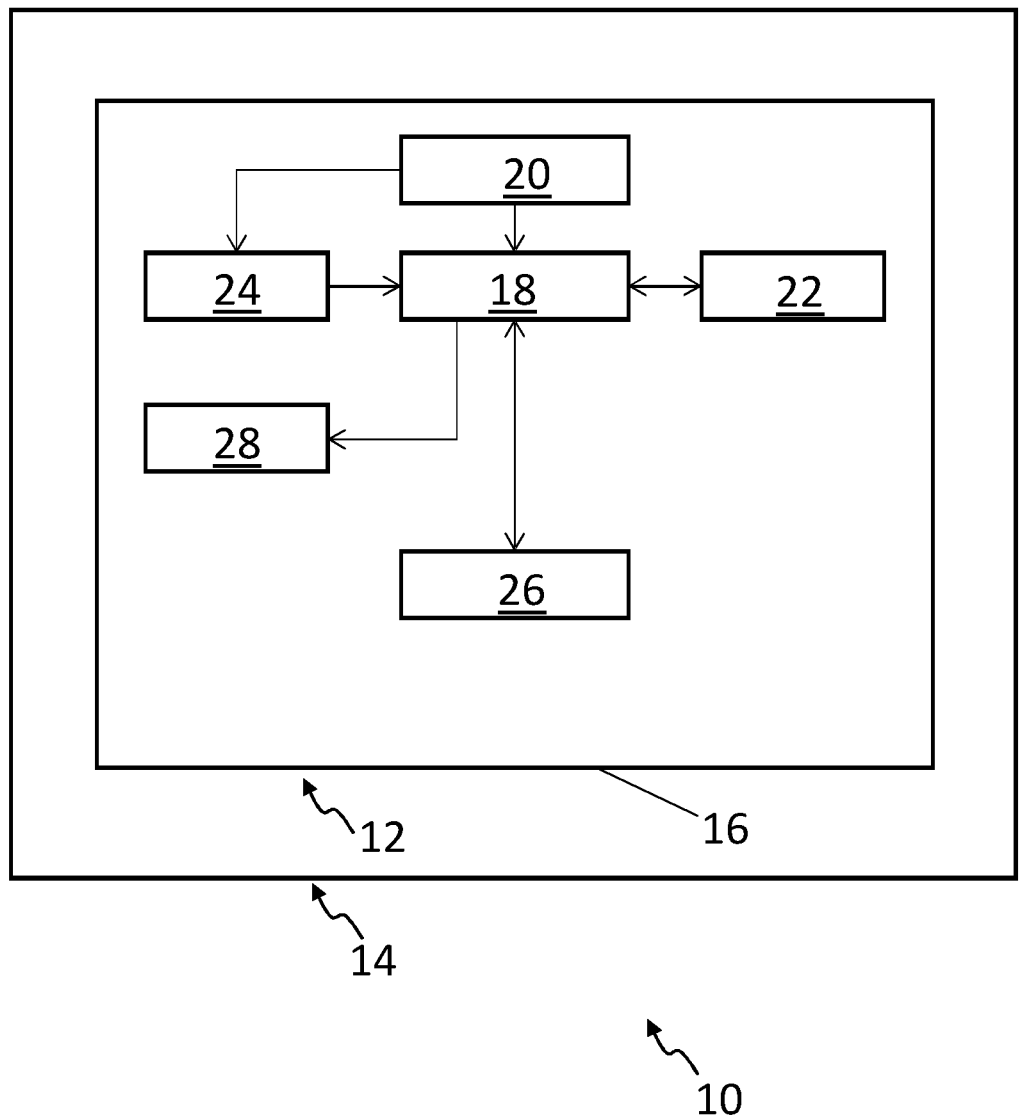
FIG. 1 is a diagram of a mobile device according to an embodiment of the invention.

Referring to FIG. 1, a mobile device for surveying harsh environments according to an embodiment of the invention is shown generally at 10. The mobile device 10 is arranged for deployment into harsh environments, such as continuous use underwater beyond two metres, subsea, or in the vacuum of space, and can comprise a Remotely Operated Vehicle (ROV), Autonomous Underwater Vehicle (AUV), robotic platform or the like.

Harsh environments place stringent requirements on a camera module, such as mechanical stresses, radiative stresses, chemical reactions and temperature exposure. Mechanical stresses can include pressure, shock, vibration, and coefficient of thermal expansion (CTE) mismatches. Radiative stresses can include cosmic rays, and magnetic influences from electromagnetism. Chemicals such as salt water, moisture, fuel and noxious gases can react with such a camera module. Temperatures below −40° C. and/or above 125° C. can also be experienced in a harsh environment.

The mobile device 10 comprises a computing device 12 mounted on a remotely operable or autonomous vehicle 14. As described in more detail below with reference to FIG. 2, the computing device 10 is housed within a protective casing 16 to enable it to work in a harsh environment such as subsea.

The computing device 12 comprises a data processor 18 communicatively coupled to a camera 20 to receive images from the camera 20.

The data processor 18 can be coupled to other devices such as network interfaces (not shown) and volatile and non-volatile memory 22. The memory 22 can store images, video, or metadata, as well as the algorithms. The data processor 18 can be suitable for computationally complex image processing and computer vision algorithms. For example, the data processor can comprise processing cores including (but not requiring) GPU cores and embedded processing for video codecs or AI operations, such as a NVidia Tegra (TM) system on a chip (SoC). The data processor 18 can comprise one or more communicatively coupled cores and/or distinct processors.

The data processor 18 is configured to execute a 3D reconstruction algorithm to develop a 3D model. To generate a 3D model from video or camera images, the 3D reconstruction algorithm can take key points that for example make up the edges of the object in the second image and associates the key points with corresponding key points from other images, such as earlier captured images or images captured concurrently by other cameras. Knowing the camera pose associated with each image, rays can be projected from the camera positions through the key points of each image and points where the rays for a particular point intersect or are best fit in 3D space represent the 3D location of the corresponding points in the 3D model. The 3D reconstruction algorithm can be Structure from Motion or any other appropriate technique that generates a 3D model from video or camera images. The 3D model can for example comprise a point cloud. The 3D reconstruction algorithm can either start building the 3D model from a pair of images, or can use the second image to augment a 3D model already being constructed by the data processor.

To create an accurate 3D model the 3D reconstruction algorithm requires multiple input images. Put another way, to model a 3D object, multiple images at different angles around the object help to build up a more reliable 3D model of the object. If two images are taken sequentially and the camera 20 has a high capture rate then the two images are likely to be very similar and the latter image received will add little information over the previous image. "Key frames" can be defined by the degree of difference between two unique views of an object. The 3D reconstruction algorithm can be arranged to compare a received third image with the preceding second image (or an earlier image) to determine the degree of difference.

The third image can contain the object from a different view point with respect to the second image due to movement of the object and/or camera 20. Once a difference threshold has been exceeded the received image is marked as a key frame. In other embodiments key frames can be identified by a data processor other than the data processor 18 and/or other means such as waiting a fixed time between key frames, e.g. 1 second or selecting every nth frame. Alternatively, an inertial measurement unit can be used to determine the camera position has moved enough to initiate a key frame.

The 3D reconstruction algorithm typically processes all of the input images (i.e. the camera 20 output dictates the processing power of the data processor 18) and chooses key frames to add points that fit well with the model under construction. Points from the key frames are joined to form a point cloud that can be processed into mesh and rendered as a solid object with computer graphics. Every time a key frame is added, the camera view is typically a unique view on the model. Unique views are ideally suited for input to object detection algorithms, as a full set of key frames can provide all the views of an object necessary to create a complete model of the object. An object detection algorithm can be run on the mobile device 10 or remotely, for example on a server.

Thus, the mobile device 10 runs the 3D reconstruction algorithm to generate 3D survey data such as a point cloud or identification of a key frame based on images captured by the camera. Since the 3D reconstruction algorithm processes pictures captured locally by the camera, the images can be high resolution. The resulting 3D survey data is relatively small in size in comparison to the images used to produce it.

The computing device 12 further comprises a pose sensor 24 arranged to determine pose data representing a pose of the mobile device. The pose is the combination of position and orientation of the mobile device in the environment. In the illustrated embodiment the pose sensor 24 comprises a Simultaneous Localisation and Mapping (SLAM) module (which can run on the data processor 18) which uses images from the camera to determine the pose based on features in the images. Alternatively or in combination, the pose sensor can comprise other sensors such as a gyroscope or accelerometer to aid in the generation of pose data. Advantageously, the pose data transmitted by the mobile device is relatively small in size in comparison to the images used to produce it. If the vehicle moves, only the pose data can be transmitted and updated, this allows the survey expert (or user) to be able to view an up-to-date and consistent 3D survey data and server site 3D model.

The computing device 12 further comprises a data transceiver 26, which can for example comprise a wireless base station.

The computing device 12 of the illustrated embodiment further comprises an optional steering and propulsion module 28 arranged to control navigation of the vehicle 14. In such embodiments, any suitable software interface can be provided to interface with on-board steering and propulsion systems of the vehicle.

The data processor 18 is configured to incrementally transmit processed data and pose data to a server (not shown) via the data transceiver 26. Knowing the survey parameters and algorithms used to generate the 3D survey data, the remote server can use the received processed data to develop a server site 3D model. Likewise, the pose data can be used to indicate the pose of the mobile device 10 relative to the server site 3D model, to enable a survey expert to visualize the location and orientation of the mobile device 10 relative to the survey site.

In the illustrated embodiment, the processed data is the 3D survey data, but in other embodiments the processed data can comprise low resolution images processed from the corresponding input images, or comprise key frames which can be of original resolution or processed to reduce the resolution.

The data transmitted can be a combination of live data and post processed data. Depending on the requirements of the project and available data link quality, it may be possible to only send small amounts of data in either direction.

The data processor 18 can be arranged to process the 3D survey data using cryptographic keys prior to transmission. Advantageously, this encodes the 3D survey data making the data more secure/confidential. The survey mobile device and the server can for example exchange cryptographic keys before the mobile device 10 is deployed to the hazardous area so that all survey data communications can be secure.

The 3D survey data can be post-processed at the mobile device 10 to reduce its size, for example by filtering, subsampling, by model fitting by identifying and discarding outliers before transmission; etc.

Figure 2:
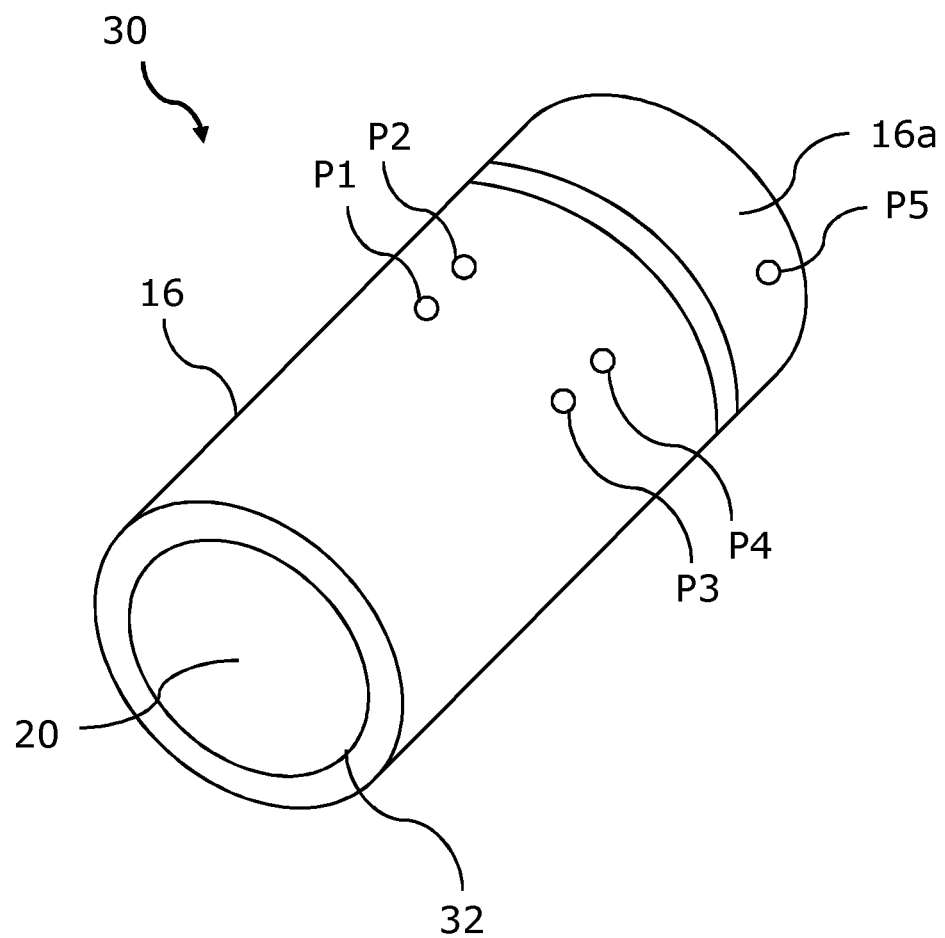
FIG. 2 is a perspective diagram of a camera module of the mobile device of FIG. 1.

Referring now to FIG. 2, the computing device of the illustrated embodiment comprises a camera module 30 for imaging in harsh environments. The camera module 30 comprises the casing 16 that defines a watertight housing having an interior space. One end of the casing 16 includes a transparent window or lens 32. The camera 20 is mounted within the interior space and arranged to capture images of the exterior environment through the window 32. The interior space of the casing 16 can be accessed by removing a casing end cap 16a which is removably coupled to a body of the casing 16 via an o-ring sealed flange. A seal can be provided between the casing end cap 16a and the body of the casing to inhibit water ingress. The casing 16 of this embodiment is formed from stainless steel and is cylindrical in shape so as to be structurally resistant to high pressures which may be experienced by the camera module 30 in an underwater harsh environment such as deep underwater environment and/or a subsea oil and gas infrastructure site. In other embodiments the material and/or shape of the casing 16 can be changed depending on the deployment environment, e.g. aluminium, copper beryllium, titanium, plastic, ionomers, PEKK, carbon fibre or ceramics in order to provide stress, chemical and/or temperature resistance. It is preferred that the material and shape of the casing 16 results in a strong and rigid structure. The shape of the casing 16 can be any pressure resistive shape such as a prism or cylinder. The camera 20 can form part of the casing 16 such that the casing 16 forms a fluid seal with at least part of the camera 20, e.g. the lens of the camera 20. Other end cap seals can be formed using methods including through-bolts or a threaded tube. Some or all of the component of the computing device 12 can be housed within the casing 16.

Ports P1-P5 can be provided for wired connections to other camera modules, computing devices or the like to provide external data links while the camera module is operating in a harsh environment such as subsea.

Figure 3A:
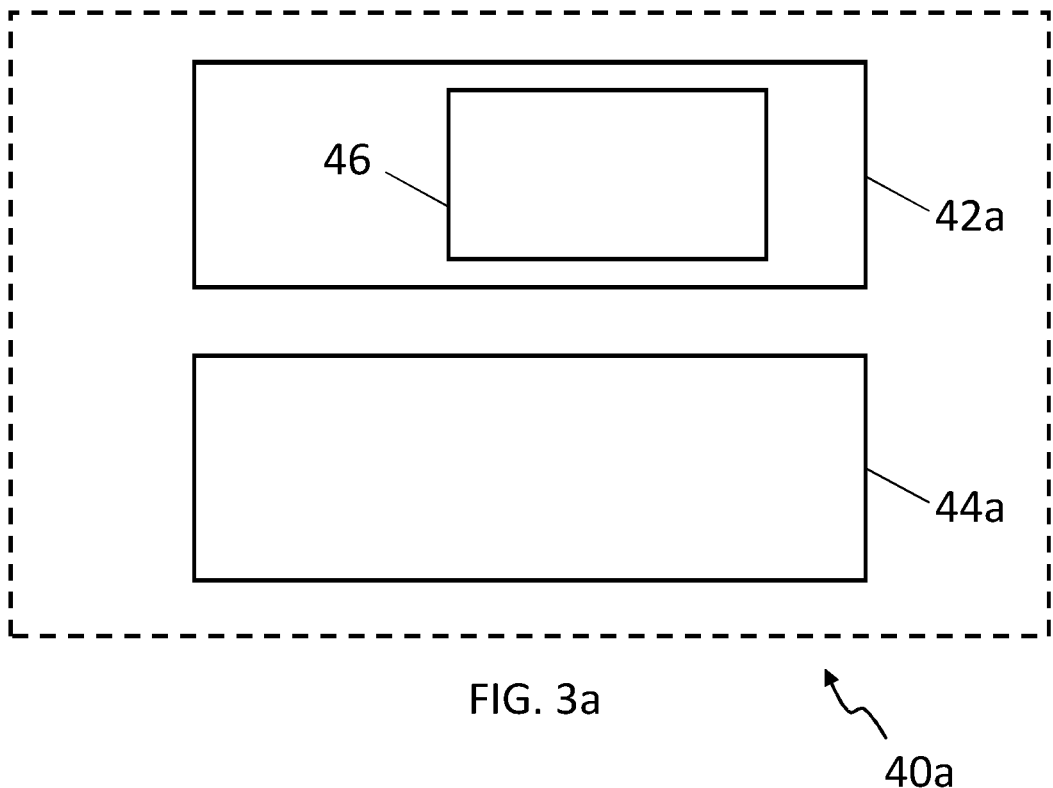
FIGS. 3a and 3b are diagrams illustrating data structures.

FIG. 3a is an example of a data structure 40a that can be transmitted from the transceiver 26 to the server. The data structure 40a comprises 3D survey data 42a, which in this example comprises a 3D model component 46 generated by the 3D reconstructions algorithm running on the data processor 18. The data structure further comprises pose data 44a. The 3D model which is local to the mobile device 10 comprises the 3D model component 46, such that the 3D model component 46 can be the whole 3D model or part of the 3D model. The data structure can be part of a data packet or any transmission protocol.

Figure 3B:
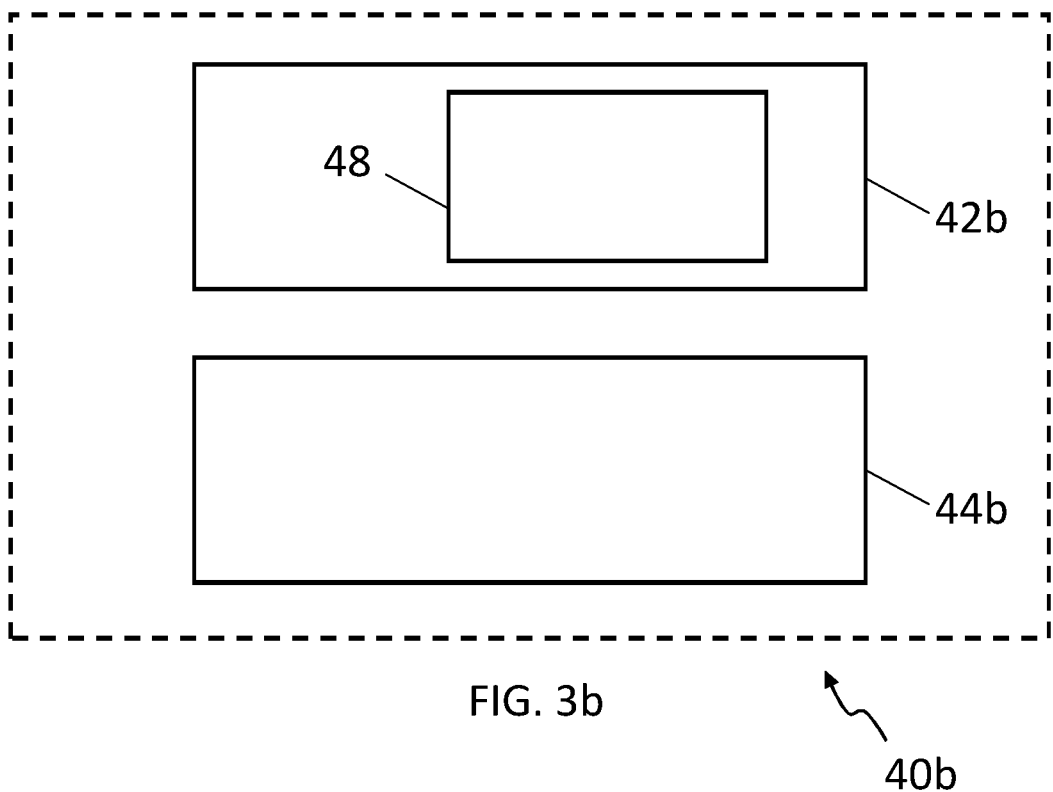

FIG. 3b is another example of a data structure 40b that can be transmitted from the transceiver 26 to the server. The data structure 40b comprises 3D survey data 42b, which in this example comprises a key frame 48 identified by the 3D reconstructions algorithm running on the data processor 18. The data structure further comprises pose data 44b.

In further examples, a data structure can comprise 3D survey data comprising one or more 3D model component(s) and/or key frame(s).

Figure 4:
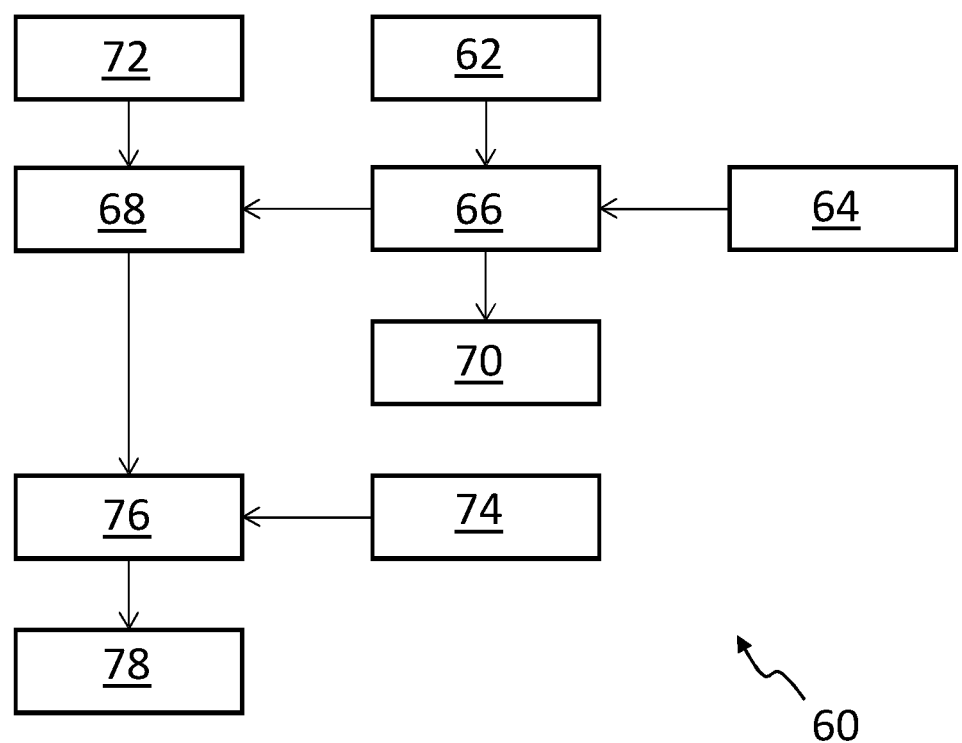
FIG. 4 is a flow chart illustrating a mobile device process according to an embodiment of the invention.

FIG. 4 illustrates a method of capturing, processing and transmitting 3D survey data according to an embodiment of the invention generally at 60.

At step 62 the camera(s) of the mobile device capture images and transmit them to the data processor.

At step 64 the pose of the mobile device is determined and the pose data is provided to the data processor.

At step 66 3D survey data is generated by the 3D reconstructions algorithm. The 3D survey data can comprise a 3D model component or a key frame, for example.

At step 68 a local 3D model is developed.

At step 70 the 3D survey data and pose data are transmitted to the server via the transceiver. The data is incrementally encoded, compressed and transmitted to the server. In other embodiments, other types of processed data can be transmitted as discussed above and/or pose data.

At optional step 72 the data processor receives refined 3D survey data from the server. This can be fed into step 68 to develop the local 3D model using the refined 3D survey data. Refined 3D survey data is described in more detail below with reference to FIG. 6b.

At optional step 74 the data processor receives control commands from the server.

At optional step 76 the data processor develops a route to be navigated by the mobile device, this can be based on the local 3D model and/or the control commands.

At optional step 78 the data processor provides one or more control commands to the propulsion and steering modules to control movement of the mobile device according to the route.

Figure 5:
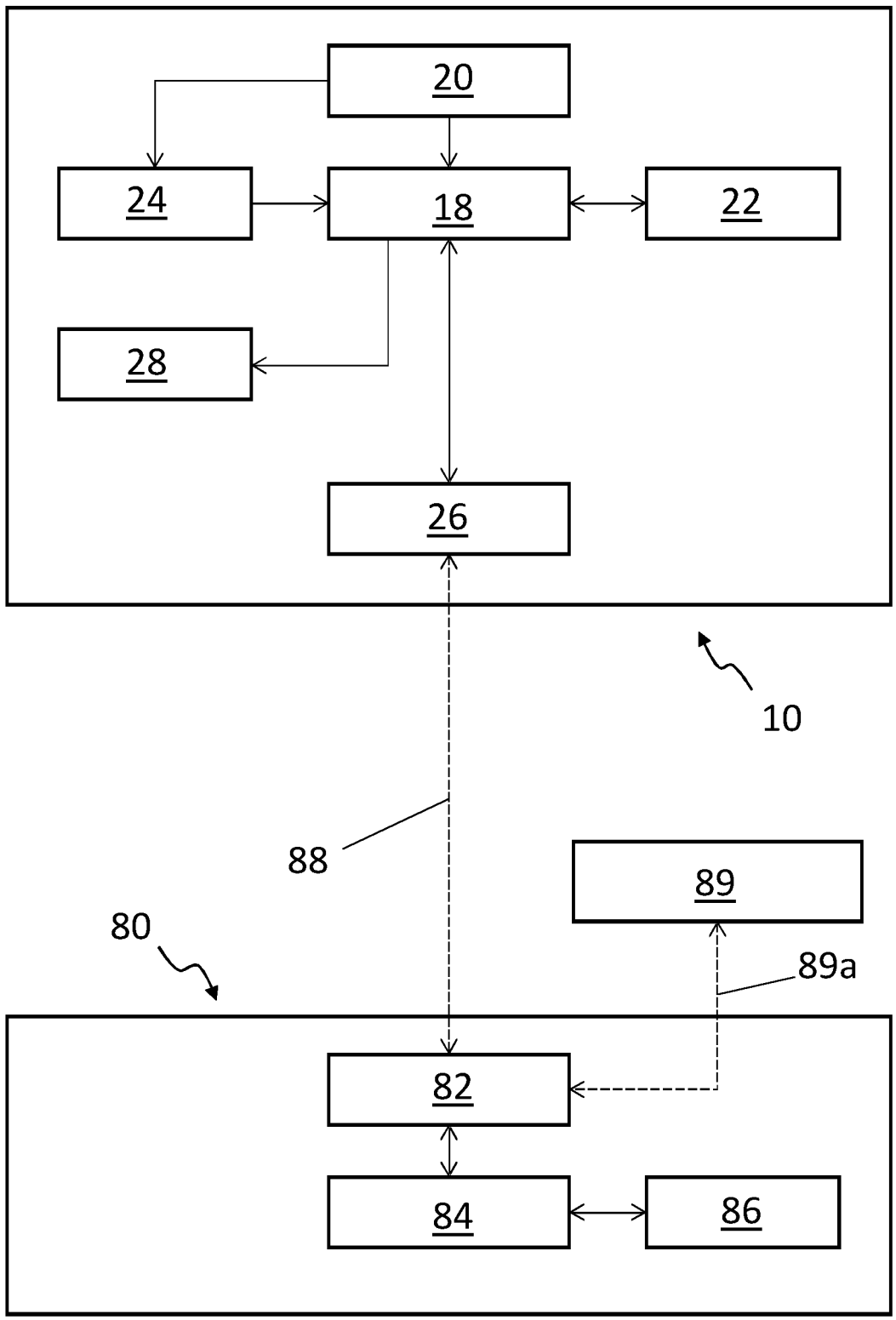
FIG. 5 is a diagram of a system according to an embodiment of the invention.

FIG. 5 is a diagram of a system according to an embodiment of the invention. The system comprises the mobile device 10 of FIG. 1 and a server 80.

The mobile device is configured to generate and incrementally transmit 3D survey data and pose data to the server via the transceiver 26.

The server 80 comprises a second data processor 84 communicatively coupled to a second transceiver 82 and a second computer memory 86. The data processor 84, transceiver 82 and computer memory 86 can be identical or similar to those of the mobile device 10. It is however preferred that the data processor 84 of the server is more powerful than that of the mobile device 10.

The transceivers 26, 82 define a bidirectional data link 88 between mobile device 10 and the server 80. The data link can be via satellite, internet, telephone system, or the like.

Figure 6A:
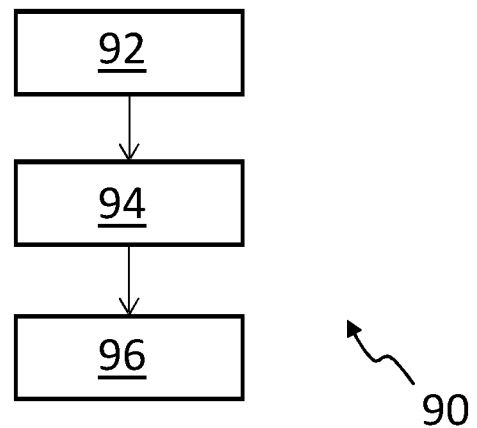
FIGS. 6a and 6b are flow charts illustrating server processes according to embodiments of the invention.

Referring to FIG. 6a, in one embodiment the server can simply replicate the algorithms from the mobile device 10 in order to build a 3D model of the survey site to present an identical view of the 3D reconstruction. This process is illustrated generally at 90.

At step 92 the server receives 3D survey data and pose data from the mobile device via the data link.

At step 94 the second data processor develops a server site 3D model using the 3D survey data. Where the 3D survey data is a 3D model component, the server site 3D reconstruction algorithm can integrate the 3D model component into the server site 3D model to develop it as updates are incrementally received. Where the 3D survey data is a key frame, the server site 3D reconstruction algorithm can process the key frame with further images to form a 3D model component for integration into the server site 3D model. Thus, the server at the safe site receives and integrates the various updates as they arrive, building its own version of the survey using prior knowledge of the survey parameters and algorithms used when generating the data. The second data processor integrates the new information into previously transmitted data. Knowledge of the methods used for the survey site processing allows the server at the safe site to replicate parts of the algorithm without requiring re-transmission of all the data points. For example, for 3D reconstruction the 3D pose and model can be updated using relatively small amounts of data such as a model generated from a group of points forming a point cloud and the pose of the vehicle carrying the cameras. When the vehicle moves, only the pose needs to be transmitted and updated, the pose having a very compact representation. This results in users at the safe site being able to view up-to-date and consistent data and models without the need to constantly transmit and receive large amounts of data.

At step 96 the second data processor develops a visualisation of the survey site, using the pose data to indicate the position and orientation of the mobile device within the visualisation of the survey site. The server can generate visualisation parameters so that a high quality visualisation may be rendered at the survey site location utilising the full resolution data that could not be transmitted due to the limitations of the communications link. For example, mesh could be generated based on point clouds received and incrementally sent back to the survey site location so that the mobile device operator has an improved visualisation of the scene, at low bandwidth and can see how complete the model is.

End users of the data can remotely visualise and examine the survey data using a thin client 89 and a network link 89a to the server without having to be in a hazardous location. One or more thin clients can be communicatively connected to a server via network links. Thin clients, such as thin client 89, may be optimised to display the data generated by the survey system or the survey system may optimise data specifically to be displayed by thin clients. A thin client may simply be a computer that runs a web browser. The end users can also connect to the server via network lines and request a copy of the data to inspect in a supported data format, upon receipt of the request the server can perform conversion from one data format to another format.

Thus, in this embodiment the system acts as an intelligent encoding of the data from the survey site, generating a visualisation and view of the survey data at the safe site without the need to transmit all the data or use a high bandwidth link. For particularly slow links, the safe site may request only data relevant to a specific viewing angle or only a specific type of data in order to reduce the amount of data transmitted.

Figure 6B:
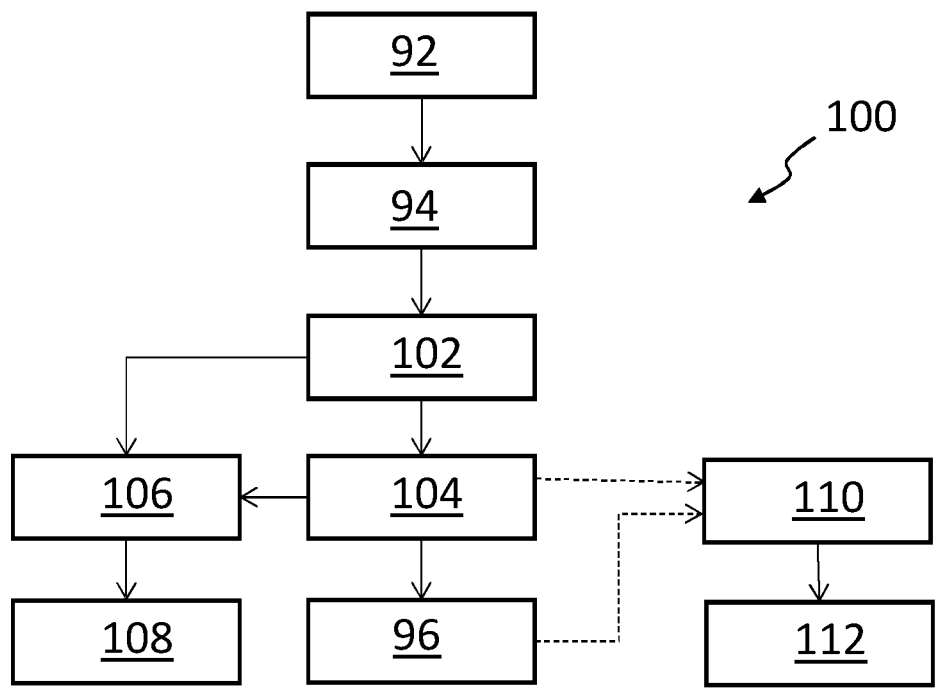

Referring now to FIG. 6*b*, the second data processor can have greater data processing capability than the first data processor. Thus, the second data processor can be physically larger than the first data processor and unconstrained by the casing of the mobile device. Advantageously, the second data processing can perform more computationally complex algorithms to generate more accurate models, and generate visualisations, the results of which can be transmitted to the first data processor. Thus, efficient use of the different data processors can be achieved with co-operative processing. This process is illustrated generally at 100.

Steps 92, 94 and 96 are the same as for process 90.

At step 102 the second data processor can be configured to identify errors in the server site and/or mobile device side 3D model. This can be achieved by generating new poses from the 3D points using a different algorithm or detecting loop closures from a more extensive search of the data. The Iterative Closest Point (ICP) algorithm can improve alignment of points in the point cloud, resulting in improved pose data for each associated key frame. The errors can be the inconsistencies between the data such as a 3D model component calculated by the mobile device at the survey site and improved data calculated by the server algorithms on a relatively powerful second data processor in comparison to the first data processor. The server can predict some errors in the calculations at the mobile as the algorithms used at the mobile device are known at the server.

At step 104 the second data processor can be configured to receive the errors identified by step 102 and further develop the server site 3D model to correct the positions of features within the server site 3D model, correct camera poses, and/or correct camera calibration parameters. The features within the server site model can be: points on a point cloud; vertices, edges, and/or faces of a mesh model; or any other features of a model. Thus, improved model accuracy can be achieved. Corrections of positions of the features can for example be used to complete loop closures. The second data processor can also determine if the selection of key frames sent from the mobile device could be improved.

At step 106 the second data processor can be configured to run a refinement algorithm to refine the 3D survey data to produce refined 3D survey data. The second data processor can also be configured to command the second data transceiver to transmit the refined 3D survey data to the mobile device. Advantageously, the refined 3D survey data can produce improved visualisations and verifies the accuracy of the local 3D model. Thus, any inaccuracies or areas of low resolution in the local 3D model can be developed.

As model information is transmitted it can be refined. For example, using 3D point clouds received by the server, additional algorithms can determine if the selection of key frames could be improved or can identify and investigate missed loop closures in the 3D model.

Using key video frames transmitted from the survey site location, it is possible to perform advanced image enhancement algorithms at the server to determine parameters for improving the image/video quality; the (low bandwidth) parameters are then fed back to the survey site location which can then perform live rendering of enhanced video and thus improve the visualisation for the mobile device operator, making the inspection faster. Using the same key frames, object detection, such as by Machine Learning, can be performed and object label co-ordinates sent back to the mobile device operator to generate Augmented Reality (AR) views. Thus the mobile device operator does not need to be an expert in the thing being surveyed in order to know how to use the mobile device to inspect it.

At step 108 the refinement algorithm can be configured cause the second data transceiver to transmit additional features to the mobile device. Additional features can be refined 3D survey data. Additional features can also be points on a point cloud, if the server site 3D model is a point cloud model. Alternatively, the features can be vertices, edges, or faces of a mesh, if the server site 3D model is a mesh model, or any other features of a model. Additional features can also be object labels from an object detection algorithm, the object detection algorithm can also be run on the second data processor or alternatively another data processor which can be part of the server or separate. Additional features can also be a new key frame selection scheme based upon the results of the refinement algorithm.

The first data processor can be arranged to run a model refinement algorithm to develop the local 3D model in response to receipt of refined 3D survey data from a remote server via the data transceiver. Advantageously, co-operative processing by the mobile device and the remote server allow for different aspects of the data to be computed. Thus, corrections or additions can be incorporated into the local 3D model.

The development of the local 3D model in response to receipt of refined 3D survey data can further comprise completing missing loop closures. Loop closing is the act of correctly asserting that a vehicle has returned to a previously visited location.

Depending on the data link, it may be possible for the server at the safe site to communicate a delta signal of the difference between the data calculated at the survey site and improved data from the safe site algorithms) and therefore help improve the accuracy of the survey data acquisition. As mentioned earlier, the safe site can predict some errors in the calculations at the survey site as the algorithms used at the survey site are known at the safe site.

The mobile device can further send back confirmations to the remote server to inform it if the information the mobile device received aided development of the local 3D model. Advantageously, the remote server can amend the refined 3D survey data based on the mobile device.

There may be known models of components of the survey data that can be used to improve the system results. For example, the survey site system may have a database of equipment that it is likely to encounter and the safe site may be able to assist in automatically identifying the correct part of a component that is currently in the field of view. The server in the safe location may also transmit parameters that the survey site system can use with the full resolution survey data to generate better quality visualisations of the structure being inspected/scanned and therefore help perform the job faster, cheaper and safer.

At step 110 the refined model and/or visualisation can be used to generate control commands which identify a region of the survey site that the mobile device should visit to help to develop the 3D model(s) of the survey site.

At step 112 control commands are sent to the mobile device arranged to cause the mobile device to visit the region. Where the mobile device is manually operated, the control commands can be instructions sent to the mobile device operator at the survey site. Where the mobile device is autonomous, the control commands can be override instructions for the steering and propulsion module.

Machine Learning techniques can be used to identify and generate models based on the data gathered so far; e.g. after identifying a piece of subsea apparatus a shared model identification code and view registration can be sent to the survey site location to inform the mobile device operator of a suggested path plan to obtain sufficient views of the apparatus being inspected to generate a complete 3D reconstruction. The aim of a 3D survey would be to build an accurate model of an object hence forming a complete model is preferred.

Advantageously, by receiving refined 3D survey data the first data processor can update its local 3D model without the need to compute the additional features, thereby increasing the processing speed at the mobile device and the speed of survey completion. Advantageously, by only transmitting the additional features and not the whole model, efficient use of the data link can be achieved.

The server can also comprise a 3D occupancy grid allowing the server to access the extent of the surveyed data without downloading all of it. Advantageously, the 3D occupancy grid may be used during transmissions as it can have a compact representation. Thus, the 3D occupancy grid can direct the mobile device to survey new areas where important new detail is anticipated. Moreover, efficient use of the data link between the mobile device and the remote server can be achieved.

A 3D occupancy grid may be used during communications as it can have a compact representation. This allows the server at the safe site to know the extent of the surveyed data without downloading all the detail and can direct the mobile device to survey new areas where important new detail is anticipated.

The server may analyse the data link quality and utilisation in order to choose the best times to send data back, how much data, what data rate and which data should have the most priority.

In some embodiments the data links from the survey location are actually relatively high bandwidth and the survey site system has too much data to process live but can feed data to a remote location for processing and receive back guidance to help improve the survey quality.

The server at the safe site can also be running more computationally intensive post-processing algorithms while it waits for updates; especially if the amount of processing power at the survey site is limited. The data points can be used for extra computations, in the case of 3D survey to recalculate the 3D model and camera poses with the model and poses from the survey site reconstruction being used as additional inputs if they were generated by a different method.

Figure 7:
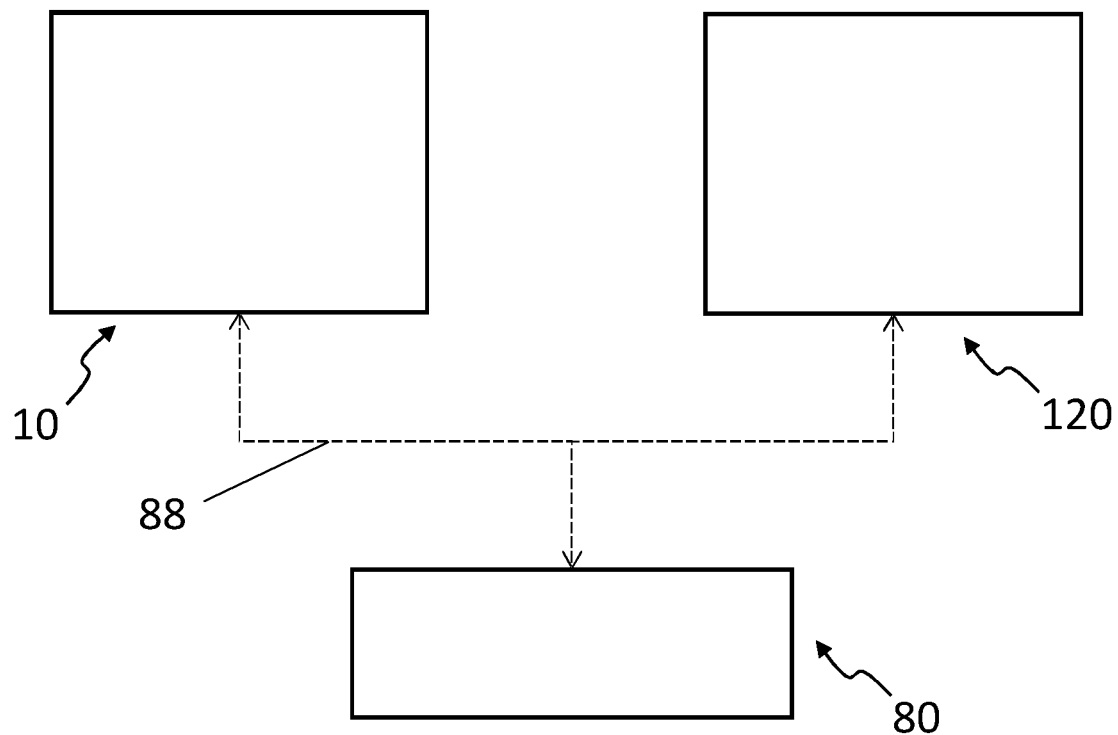
FIG. 7 is a diagram of a system according to an embodiment of the invention.

Referring to FIG. 7, in further embodiments the system can also comprise a second mobile device 120 in the same environment/survey site. Both mobile devices 10, 120 can co-operate with one server 80. This enables the vehicles to co-operatively survey the site environment. The two mobile devices 10, 120 can communicate with each other and the remote server 80 via the data link 88, where each has a common understanding of what 3D reconstruction algorithms are being used. The remote server 80 can transmit updates generated by algorithms working on the data transmitted from both vehicles as well as visualisations.

Figure 8:
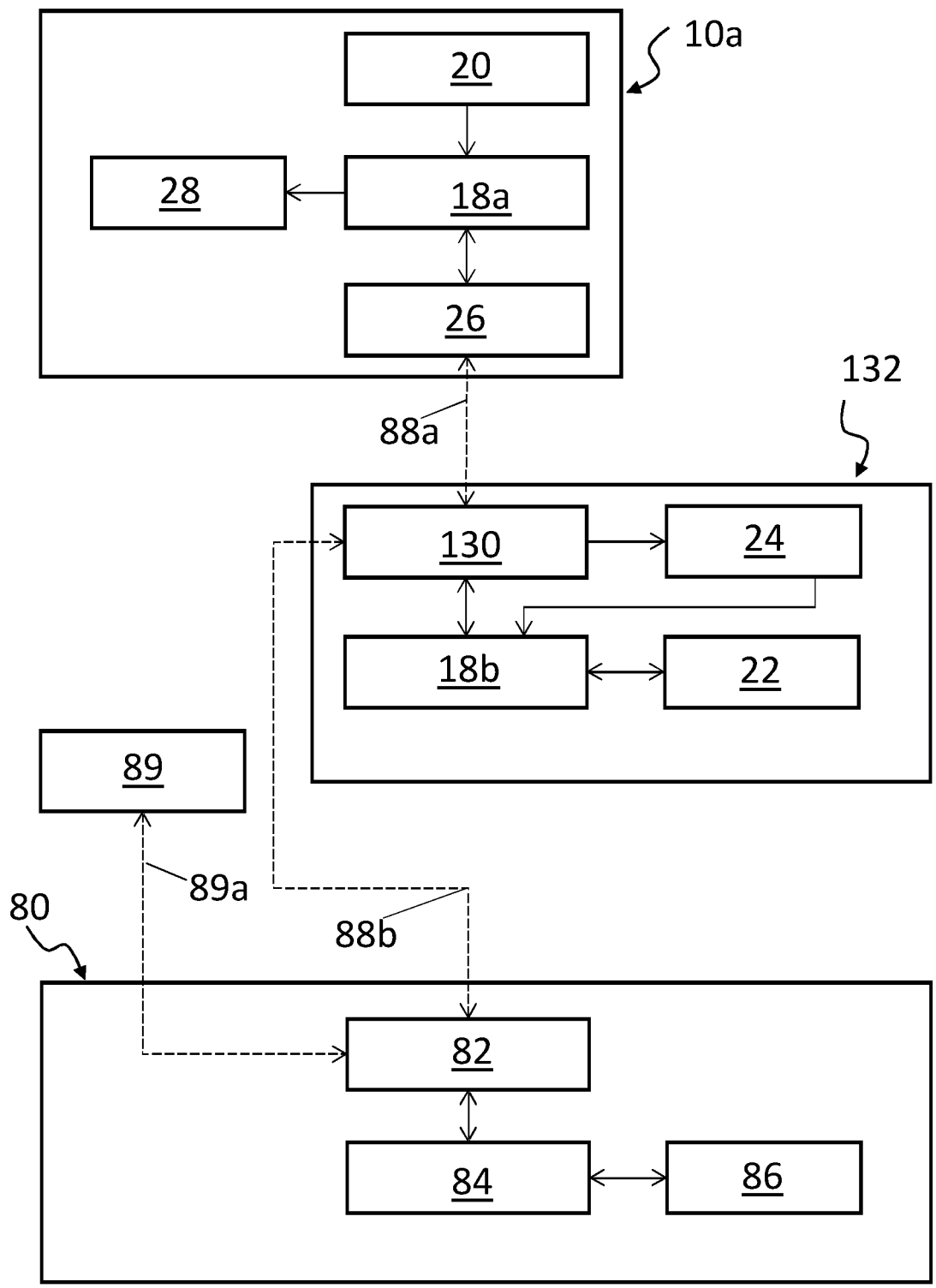
FIG. 8 is a diagram of a system according to a further embodiment of the invention.

FIG. 8 is a diagram of a system according to a further embodiment of the invention. The system comprises a mobile device 10a, a vessel 132 (such as a boat), and a server 80 of FIG. 5. The processing capability of mobile device 10 is shown in FIG. 8 to be distributed over mobile device 10a and vessel 132.

The mobile device 10a is similar to mobile device 10 in that it is housed within a protective casing, comprises a computing device mounted on a remotely operable or autonomous vehicle. The computing device comprises a mobile device data processor 18a communicatively coupled to an imaging device such as a camera 20 to receive images from the camera 20. The mobile device 10a can optionally comprise a steering and propulsion module 28.

The data processor 18a is configured to receive images from the camera 20. The mobile device 10a is configured to transmit the images to the vessel 132 via a vessel (medium bandwidth) data link 88a such as a cable between the mobile transceiver 26 and the vessel transceiver 130. In other embodiments data processor 18a can be arranged to pre-process the images; for example, process the received images to generate key frames.

The vessel 132 comprises a vessel data processor 18b, a pose sensor 24, a volatile and non-volatile memory 22, and two transceivers 130. The pose sensor 24 and memory 22 operate in substantially the same way as in the mobile device 10. Alternatively or in combination, the pose sensor can be housed in the mobile device 10a.

The vessel 132 is configured to execute the 3D reconstruction algorithm as discussed previously to generate and incrementally transmit processed data and/or pose data to the server 80 via a low bandwidth data link 88b between the vessel transceiver 130 and server transceiver 82.

The transceivers 26, 130 and 82 define bidirectional data links 88a and 88b between mobile device 10a, vessel 132, and the server 80. The data links can be via satellite, internet, telephone system, or the like.

Mobile devices, systems and methods according to embodiments of the invention can be utilised in the field of offshore and subsea survey but can also apply to any survey system for hazardous environments such as space, nuclear, mining, etc. The survey can be performed either autonomously, semi autonomously, manually via remote control, or manually using a minimal size crew in order to reduce the risk. Sending crews to hazardous locations involves the inconvenience of taking safety precautions and therefore increases the cost. The mobile device can, for example, be a ROV or AUV.

In any embodiment the camera can alternatively be replaced or supplemented by any device that can image an area i.e. an imaging device. Thus, the imaging device can be one or more cameras, sonar equipment, or laser scanning equipment, or alternatively a combination of said camera, sonar equipment, and/or laser scanning equipment.

Although the invention has been described above with reference to one or more preferred embodiments, it will be appreciated that various changes or modifications can be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A surveying system for surveying in harsh environments, the surveying system comprising:
   a mobile device comprising:
      a casing defining a sealed enclosure; and
      an imaging device;
   a first data processor;
   a first computer memory;

a pose sensor arranged to determine pose data representing a pose of the mobile device;
a first data transceiver;
wherein the first data processor is arranged to:
receive images from the imaging device and execute a first 3D reconstruction algorithm to generate 3D survey data from the received images and develop a local 3D model on the first computer memory;
process the received images to form processed data; and
cause the first data transceiver to transmit the processed data and/or the pose data for receipt by a server, wherein the first data processor is arranged to execute a model refinement algorithm to develop the local 3D model in response to receipt of refined 3D survey data from the server via the first data transceiver,
wherein the first data processor is arranged to cause the first data transceiver to incrementally transmit the processed data for receipt by the server while the local 3D model is being developed, wherein the first data processor is arranged to execute the model refinement algorithm to develop the local 3D model in response to an incremental receipt of refined 3D survey data from the server via the first data transceiver.

2. A surveying system according to claim 1, further comprise a vessel, wherein the first data processor comprises:
a mobile device data processor located on the mobile device; and
a vessel data processor located on the vessel,
the mobile device data processor being communicatively coupled to the vessel data processor by a vessel data link,
wherein the mobile device data processor is configured to transmit the images captured by the imaging device to the vessel data processor,
wherein the vessel comprises the first computer memory and the first data transceiver and the vessel data processor is arranged to:
receive the images from the imaging device and execute the first 3D reconstruction algorithm to generate 3D survey data from the received images and develop the local 3D model on the first computer memory;
process the received images to form processed data; and
cause the first data transceiver to transmit the processed data and/or the pose data for receipt by the server.

3. A surveying system according to claim 1, wherein the processed data comprises the 3D survey data.

4. A surveying system according to claim 1, wherein the 3D survey data comprises a 3D model component generated by the first 3D reconstruction algorithm.

5. A surveying system according to claim 1, wherein the 3D survey data comprises a key frame and the first data processor is configured to identify whether a received image is a key frame and, if so, command the first data transceiver to transmit the key frame for receipt by the server.

6. A surveying system according to claim 1, further comprising steering and propulsion modules communicatively coupled to the first data processor, the first data processor being configured to run a navigation algorithm for controlling steering and propulsion of the mobile device.

7. A surveying system according to claim 6, wherein the navigation algorithm is configured to control steering and propulsion of the mobile device in accordance with control commands received from the server via the first data transceiver.

8. A method of surveying in harsh environments using the surveying system of claim 1, the method comprising:
receiving images from an imaging device;
determining pose data representing a pose of the imaging device;
processing the received images to generate a local 3D model and processed data;
transmitting from a transceiver the processed data and/or the pose data for receipt by the server;
receiving refined 3D survey data from the server via the transceiver; and,
processing the refined 3D survey data to identify errors and correct the positions of features within the local 3D model.

9. A method according to claim 8, further comprising:
at the server, the server being remote from the imaging device:
receiving the processed data and/or pose data transmitted from the transceiver;
processing the processed data and/or pose data to develop a server site 3D model.

10. A surveying system according to claim 1, wherein the first data processor is arranged to execute the model refinement algorithm to develop the local 3D model to identify errors and correct the positions of features within the local 3D model.

11. A surveying system according to claim 1, wherein the development of the local 3D model in response to receipt of refined 3D survey data further comprises completing missing loop closures.

12. A surveying system according to claim 1, wherein the mobile device is autonomous.

13. A surveying system for surveying in harsh environments, the surveying system comprising:
a mobile device comprising:
a casing defining a sealed enclosure; and
an imaging device;
a first data processor;
a first computer memory;
a pose sensor arranged to determine pose data representing a pose of the mobile device;
a first data transceiver included in the mobile device;
wherein the first data processor is arranged to:
receive images from the imaging device and execute a first 3D reconstruction algorithm to generate 3D survey data from the received images and develop a local 3D model on the first computer memory;
process the received images to form processed data; and
cause the first data transceiver to transmit the processed data and/or the pose data for receipt by a server, wherein the first data processor is arranged to execute a model refinement algorithm to develop the local 3D model based on refined 3D survey data in response to receipt of the refined 3D survey data from the server via the first data transceiver, wherein at least one of the imaging device, the first data processor, the first computer memory, the pose sensor and the first data transceiver are housed within the casing, wherein the server is remote from the mobile device and comprises:
a second data processor;
a second computer memory including a repository detailing the first 3D reconstruction algorithm utilised by the mobile device;
a second data transceiver;
wherein the second data processor is arranged to:
receive processed data from the second data transceiver; and
run a second 3D reconstruction algorithm to develop a server site 3D model on the second computer memory using the processed data and wherein the refined 3D survey data comprises additional features of a 3D model based on the received images, wherein the first reconstruction algorithm does not generate the additional features in the development of the local 3D model, wherein the first data processor is arranged to execute the model refinement algorithm to develop the local 3D model based on the additional features and the development of the local 3D model in response to receipt of refined 3D survey data further comprises a delta signal of the difference between the local 3D model and the server site 3D model.

14. A surveying system according to claim 13, wherein the second data processor is further arranged to:
receive a request to access the server site 3D model, processed data, and/or pose data from the second data transceiver;
receive a desired data format;
process the request and translate the server site 3D model, processed data, and/or pose data, into the desired data format to generate inspection data, wherein inspection data is a visualisation of the server site 3D model, processed data, and/or pose data.

15. A surveying system according to claim 13, wherein the processed data comprises the 3D survey data and the second data processor is configured to:
run a refinement algorithm to refine the 3D survey data to produce refined 3D survey data; and
command the second data transceiver to transmit the refined 3D survey data to the mobile device.

16. A surveying system according to claim 15, wherein the refinement algorithm is configured to identify errors and correct the positions of features within the server site 3D model.

17. A surveying system according to claim 15, wherein the refinement algorithm is configured to develop the server site 3D model to include additional features and cause the second data transceiver to transmit the additional features to the mobile device.

18. A surveying system according to claim 13, further comprising a steering and propulsion modules communicatively coupled to the first data processor, the first data processor being configured to run a navigation algorithm for controlling steering and propulsion of the mobile device, wherein the second data processor is configured to:
run a path override algorithm to generate override control commands; and
cause the second data transceiver to transmit the override control commands to the mobile device, wherein the override control commands are instructions for the steering and propulsion module.

* * * * *